United States Patent Office 3,398,213
Patented Aug. 20, 1968

3,398,213
POLYMERIZATION OF COBALT CONTAINING UNSATURATED POLYESTER RESINS
Edward Chetakian, Anaheim, Calif., assignor to The Norac Company, Inc., Azusa, Calif., a corporation of California
No Drawing. Continuation-in-part of application Ser. No. 50,308, Aug. 18, 1960. This application Apr. 12, 1965, Ser. No. 447,547
3 Claims. (Cl. 260—863)

ABSTRACT OF THE DISCLOSURE

The cure rate of unsaturated polyester resins is improved by adding chelating agents selected from the group consisting of ethylene diamine tetraacetic acid and diethylene triamine pentaacetic acid. The resins contain soluble cobalt salts as the promoter and methyl ethyl ketone peroxide as catalyst.

---

This application is a continuation in part of copending application Ser. No. 50,308 filed Aug. 18, 1960, now abandoned.

The present invention relates to a method of polymerizing a resin, and more particularly to a catalyst composition that can be used to polymerize a resin.

The process by which unsaturated liquid resin hardens into a solid polymer substance that can be used as a construction material or as a protective coating is called "polymerization" or "curing." One of the difficulties encountered in using unsaturated liquid resins is that of controlling the rate of polymerization, or the amount of time required for curing, at room temperature. Several different catalysts are in current use for that purpose, but all such catalysts either do not sufficiently increase the rate of polymerization at room temperature, are too explosive and unsafe, or decompose too rapidly.

It is an object of the present invention, therefore, to provide a novel method of polymerizing a resin.

It is another object of the present invention to provide a catalyst composition that decomposes slowly and that can be used to polymerize a resin fast and safely at room temperature.

According to the present invention, there is provided a chelating agent-organic peroxide catalyst composition for the polymerization of a resin.

The features of the present invention that are believed to be novel are set forth with particularity in the appended claims. The present invention, both as to its organization and manner of operation, together with further objects and advantages thereof, may best be understood by reference to the description that follows.

A catalyst that forms free radicals when it decomposes will aid in the polymerization of an unsaturated liquid resin. Commercial polyester resins that can be cured at room temperature usually contain a small qantity, about ½% by weight, of a soluble organic metal drier such as cobalt naphthanate, which hastens decomposition of the catalyst at room temperature, so as to initiate polymerization. Once polymerization starts, it continues on to completion, because of its exothermic nature. The physical state of the liquid resin changes during the curing process until, upon the completion of polymerization, the resin has solidified.

The catalyst of the present invention for polymerizing unsaturated liquid resin at room temperature is obtained by mixing a low temperature dissociating organic peroxide catalyst such as methyl ethyl ketone peroxide that is diluted by an inactive diluent such as dimethyl phthalate, with a chelating agent such as 2,4-pentanedione. Although the exact proportions will vary according to the needs, a proportion by weight of 45% methyl ethyl ketone peroxide:30% dimethyl phthalate:25% 2,4-pentadione has been found to be ideal for polyester resins. The resulting catalyst is a colorless liquid.

By way of definitions, a low temperature dissociating peroxide catalyst is a catalyst that dissociates so as to liberate free radicals at temperatures less than 140° F., and a chelating agent is a compound able to form a metallic complex in combination with a soluble metal salt.

Pure methyl ethyl ketone peroxide is very explosive, and it is diluted by an inactive diluent to decrease its explosiveness. When the diluent is dimethyl phthalate, which is oily and has a relatively low boiling point, the result is a low viscosity liquid. When the diluent is dioctyl phthalate, which has a relatively high boiling point, the result is a higher viscosity liquid. The higher viscosity liquid has the higher flash point, which is the temperature at which the diluent gives off sufficient vapor to flash momentarily on the application of a small flame. The most satisfactory ratio of methyl ethyl ketone peroxide to diluent is 60%:40% by weight.

When a commercial polyester resin is catalyzed at room temperature by a low temperature dissociating peroxide catalyst in combination with a chelating agent, the chelating agent forms a metal complex with the soluble organic metal drier in the polyester. The metal complex that is formed is more reactive in initiating polymerization by decomposing the peroxide catalyst into free oxygen radicals than is the organic metal salt by itself. Thus, when dilute methyl ethyl ketone peroxide is used in combination with 2,4-pentanedione and the resin contains a cobalt salt, the cobalt complex that is formed results in a much more rapid polymerization than when methyl ethyl ketone peroxide is used without the 2,4-pentanedione, both as to initiation time and completion time. A very satisfactory ratio of diluted methyl ethyl ketone peroxide to 2,4-pentanedione has been found to be 3:1 parts by weight. The ratio of diluted methyl ethyl ketone peroxide to 2,4-pen- position to the resin should be approximately 1:99 parts by weight, the ratio determining the amount of time required for curing.

Although in the presence of polyester resins containing soluble metal salts polymerization takes place much more rapidly when a chelating agent is added, the addition of the chelating agent to the methyl ethyl ketone peroxide in the absence of a polyester resin decreases its explosiveness and lessens its fire hazard. Methyl ethyl ketone peroxide has been known to start a fire when contaminated by a soluble metal salt, as when it has been carelessly spilled on a floor containing a cobalt salt. But when a chelating agent has been added to the methyl ethyl ketone peroxide, the resulting dilution decreases the amount of oxygen available, and although the rate of decomposition of the peroxide by the metal salt is faster in the presence of the chelating agent, the concentration of the oxygen potentially available is reduced by at least 25%, making the diluted composition considerably less likely to explode spontaneously.

The instant invention involves the discovery that agents capable of chelating with the siccative metals produce an extraordinary synergism on the initiation or catalysis of polymerization of ethylenically unsaturated compounds by the redox mechanism involving peroxides and a siccative metal.

Two broad classes of chelating agents have been found to be particularly effective. One comprises ethylenediaminetetraacetic acid and related compounds commonly known as Versenes from the trade name. The second class comprises the enolyzable ketones. Inadequate solubility of the chelating agent and complex limit the effectiveness of some agents.

The exact mechanism of the process by which chelating agents accelerate and or increase the efficiency of the redox reaction is not known nor understood. However, since such widely varying types of chelating agents are effective and since the only common property is their ability to complex with or chelate the siccative metal, it is presumed that such a complex in some way is involved in the synergism.

The result of the synergism is faster gels and cures and a higher exotherm. The advantages derived from this synergism include more production speed, greater control and a saving in cost of materials by a reduction in the amount of peroxide required.

The chelating agents found to give the largest degree of synergism were 2,4-pentanedione and esters of acetoacetic acid.

The amount of agent required to produce effective synergism varies from compound to compound but in general is in the range of 0.01 to 5% with the optimum usually in the range of 0.1 to 2%.

The chelating agent can be added either separately, at the same time as the peroxide, to the monomer or resin prior to the addition of the peroxide, or combined with the peroxide and added together.

Optimum synergism is observed usually at a somewhat larger concentration than the stoichiometric ratio with the siccative metal. Thus a large response is observed by the addition of 2,4-pentanedione to a system containing cobalt acetylacetonate.

Of the siccative metals, or driers as they are often known, manganese and cobalt salts have been found to be particularly effective with cobalt the preferred metal.

All peroxides that undergo the normal redox reactions with siccative metals have been found to be active in the instant invention. While the organic hydroperoxides and the 1-hydroxy-1-hydroperoxides and peroxides derived from ketones are the agents commonly employed, the process functions as well with hydrogen peroxide and peracids. The latter in the past have produced gels but poor cures.

The hydroxy peroxides prepared from methyl ketone, alkyl acetoacetates, 2,4-pentanedione and cyclohexanone all were found to exhibit spectacular activity, particularly with 2,4-pentanedione and alkyl acetoacetates as the chelating agent. 2,4-pentanediol produces a strong synergism with the dihydroxyperoxide from 2,4-pentanedione in combination with a cobalt salt and a monomer or resin.

Acyl peroxides and dialkyl peroxides have not been found to be active.

The present invention is effective with all ethylenically unsaturated monomers and resins that polymerize by a free radical mechanism. It is particularly useful with those monomers and resins that polymerize at a reasonable rate at room temperature. It, therefore, has found its greatest application with the "unsaturated polyester resins" and related materials.

"Unsaturated polyester resin" is the term commonly used today to designate a class of resins composed of an alkyd (polyester) resin containing unsaturated sites usually derived from maleic or fumaric acid and a vinyl or allyl monomer such as styrene, methyl methacrylate, divinyl benzene, chloro styrene, diallyl phthalate or diallyl maleate. The rate of polymerization of the allyl radical being somewhat slower than many of the vinyl monomers, elevated temperatures are often required when the system is employed.

Examples 1 and 2 give the formulation of typical polyester resins. The term "unsaturated polyester resin" is often shortened to just "polyester resin" or even "polyester." It is realized that this is in accord with strict chemical nomenclature but these terms are used herein in their common usage sense since the class of materials they represent are well known by these terms in the art.

The term methyl ethyl ketone peroxide as used herein refers to the commercial 60% solution which is safe to handle.

The effective amounts of peroxides employed depend upon the particular peroxide and are in general the same or less than the amount normally employed commercially, that is, from about 0.05% to 3% and usually from 0.1 to 2%.

The siccative metal is effective over a wide range. When a cobalt salt is employed concentrations are the same as those employed commercially or 0.001% to 0.1% by weight cobalt metal.

EXAMPLE 1

To samples of a typical "unsaturated polyester resin" prepared as follows:

65% alkyd (polyester) resin acid No. 45–50 prepared from 1 mole maleic anhydride, 1 mole phthalic anhydride and 2.2 moles propylene glycol.

35% styrene plus 0.13% hydroquinone, and 0.03% cobalt as cobalt naphthenate and containing varying amounts of 2,4-pentanedione was added 1% methyl ethyl ketone peroxide at 25° C. as follows:

| 2,4-pentanedione, (percent) | Gel Time (min.) | Cure Time (min.)[1] |
| --- | --- | --- |
| 0 | 28 | 124 |
| 0.001 | 26.5 | 113 |
| 0.01 | 25 | 103 |
| 0.05 | 23 | 88 |
| 0.10 | 17.5 | 64 |
| 0.20 | 12.7 | 52 |
| 0.40 | 8.2 | 35 |
| 0.80 | 7.1 | 35 |
| 1.60 | 6.0 | 64 |
| 2.40 | 7 | 113 |
| 3.20 | 8 | 163 |
| 4.80 | 9.5 | 186 |

[1] Cure time as given in these examples is the time for a thin section to reach 10 on the Barcol 935 Impressometer.

EXAMPLE 2

To samples of a typical chemical resistant "double promoted resin" prepared as follows:

70% of an alkd (polyester) resin prepared from 1 mole maleic anhydride 1 mole phthalic anhydride and 2.1 moles bisphenol A.

30% of styrene plus 0.013% hydroquinone and 0.03% cobalt as cobalt naphthenate and 0.06% dimethyl aniline containing the following amounts of ethyl acetoacetate was added 1% methyl ethyl ketone peroxide 25° C. as follows:

| Ethyl Acetoacetate (percent) | Gel Time (min.) | Cure Time (min.) |
| --- | --- | --- |
| 0 | 20.5 | 80 |
| 0.05 | 19 | 73 |
| 0.10 | 20 | 71 |
| 0.20 | 19 | 64 |
| 0.4 | 16 | 47 |
| 0.8 | 13 | 35 |
| 1.6 | 10.5 | 215 |
| 3.2 | 7.5 | 215 |

EXAMPLE 3

Resin and method of Example 1.

1% methyl ethyl ketone peroxide 20° C. 0.4% of additive, as follows:

Gel time, min.
Control _____ 57
2,4-pentanedione _____ 13
Ethyl acetoacetate _____ 42
2,3-butanone _____ 41
2,5-hexandione _____ 58

EXAMPLE 4

Resin and method of Example 1.

1% methyl ethyl ketone peroxide 23° C. 1% of additive as follows:

| | Gel time, min. |
|---|---|
| Control | 37 |
| Methyl ethyl ketone | 50 |
| Acetone | 40 |
| Cycohexanone | 40 |
| Ethyl acetoacetate | 14 |
| 2,4-pentanedione | 7 |

EXAMPLE 5

The resin and method of Example 1.
1% methyl ethyl ketone peroxide 22° C. as follows:

| Dibenzoylmethane, percent: | Gel time, min. |
|---|---|
| 0 | 49 |
| 0.10 | 40.5 |
| 0.30 | 29.0 |

EXAMPLE 6

The resin and method of Example 1.
1% methyl ethyl ketone peroxide 23° C. as follows:

| Diethylenetriamine pentaacetic acid,[1] percent: | Gel time, min. |
|---|---|
| 0 | 38 |
| 0.05 | 39 |
| 0.10 | 36 |
| 0.20 | 32 |
| 0.40 | 28 |
| 0.80 | 32 |

| Ethylene diamine tetraacetic acid (20% sol'n), percent: | |
|---|---|
| 0 | 55 |
| 0.05 | 53 |
| 0.10 | 48.5 |

[1] Adjusted to pH 6.

EXAMPLE 7

The resin and method of Example 2.

| Dipivaloyl methane (percent) | Gel Time (min.) | Temp. 25° cure [1] at 80 min. |
|---|---|---|
| 0 | 19 | 20 |
| 0.05 | 18.5 | 30 |
| 0.10 | 17.5 | 35 |
| 0.20 | 18.5 | 30 |

[1] Barcol 935 Impressometer.

EXAMPLE 8

The resin and method of Example 1.
1% of organic peroxide 25° as follows:

| 2,4-pentanedione (percent) | Gel time bis(1-hydroxy cyclohexyl-1) peroxide (min.) | Cyclohexanone peroxide (min.) |
|---|---|---|
| 0 | 67 | 40 |
| 0.05 | 15 | 27 |
| 0.10 | <12 | |
| 0.2 | <10 | 23 |
| 0.4 | 8 | 21 |
| 0.8 | 13 | 21 |
| 1.6 | 23 | 21 |
| 2.4 | 28 | 28 |
| 3.2 | 32 | 36 |
| 4.8 | 31 | 49 |

EXAMPLE 9

The resin and method of Example 1. 25° C. as follows:

| 2,4-pentanedione (percent) | Gel time tert-butyl hydroperoxide 2% (min.) | Cumene hydroperoxide 1% (min.) |
|---|---|---|
| 0 | >500 | 426 |
| 0.10 | >500 | 319 |
| 0.40 | 313 | 222 |
| 1.60 | 301 | 270 |
| 6.40 | 359 | 303 |

EXAMPLE 10

The resin of Example 1 but with the cobalt naphthenate concentration as specified below was combined with 1% 2,4-pentanedione and 1% methyl ethyl ketone peroxide as follows:

| 6% cobalt naphthenate, percent: | Gel time, min. |
|---|---|
| 0 | >360 |
| 0.01 | 240 |
| 0.02 | 120 |
| 0.05 | 55 |
| 0.10 | 15 |
| 0.2 | 7.5 |
| 0.5 | 4.5 |

WITHOUT 2,4-PENTANEDIONE

| | |
|---|---|
| 1% manganese naphthenate (6%) | hrs 10 |
| Same with 1% ethyl acetoactate | min 84 |

EXAMPLE 11

The resin and method of Example 1.
1% methyl ethyl ketone peroxide 28° C. as follows:

| Additive | Peak exotherm (° C.) | Time to peak exotherm (min.) |
|---|---|---|
| 0 | 161 | 43 |
| 0.4% ethyl acetoacetate | 167.5 | 31 |
| 0.4% 2,4-pentanedione | 175 | 15 |
| 0.4% 2,3-butanedione | 103 | 130 |

EXAMPLE 12

The resin and method of Example 1. 0.28% $H_2O_2$ 19° C. as follows:

| 2,4-pentanedione (percent): | Gel Time (min.) | Cure Time (min.) |
|---|---|---|
| 0 | 8¾ | 171 |
| 0.01 | 7½ | 113 |
| 0.02 | 7½ | 77 |
| 0.05 | 7¼ | 27 |
| 0.10 | 7¼ | 18 |
| 0.45% $H_2O_2$ ethylacetoacetate (percent): | | |
| 0 | 5¾ | 21¼ |
| 0.5 | 6 | 107 |

EXAMPLE 13

To the resin of Example 1 but without cobalt naphthenate was added the following 1% methyl ethyl ketone peroxide 22° C.

| | 2,4-pentanedione, (percent) | Gel Time (min.) | Cure Time (min.) |
|---|---|---|---|
| Cobalt acetyl acetonate (percent): | | | |
| 0.132 | 0 | 14.5 | 66 |
| 0.132 | 0.2 | 7 | 22 |
| Cobalt naphthenate (6%) (percent): | | | |
| 0.5 | 0 | 20 | 115 |
| 0.5 | 0.2 | 6.5 | 22.5 |

EXAMPLE 14

The resin and method of Example 1, 23° C.

| 2,4-pentanedione (percent) | Peroxide 1% | Gel Time | Cure Time |
|---|---|---|---|
| 0.5 | Benzoyl peroxide | >24 hrs | |
| 0.5 | 2,4-dichlorobenzoyl peroxide | >24 hrs | |
| 0.5 | Di-tert-butyl peroxide | >24 hrs | |
| 0.5 | Perlauric acid | 2¾ min, tack free 10 min. | 18 hrs, Barcol 40. |
| 0 | do | 47 min., tack free 10 hrs. | >30 hrs. |
| 0.5 | Methyl ethyl ketone peroxide | 8 min | 45 min. |

EXAMPLE 15

The resin and method of Example 1. 20° C. as follows:

| 2,4-pentanedione, percent | | Percent |
|---|---|---|
| 0 | 3,5-dimethyl-3,5-dihydroxy-1.2-peroxy cyclopentane | 0.16 |
| 0.5 | do | 0.16 |
| 0 | Ethyl 3-hydroxy-3-hydroperoxy butyrate | 1.0 |
| 0.5 | do | 1.0 |

| Gel time (min.) | Cure time, (min.) |
|---|---|
| 57 | 45 |
| 11¼ | 13 |
| 6 | 27 |
| 6 | 8 |

EXAMPLE 16

(1) To the resin of Example 1 was added 1% methyl acetoacetate after standing 1% methyl ethyl ketone peroxide was added.

Gel time—19 min.

(2) A mixture of 50% of methyl ethyl ketone peroxide and 50% methyl acetoacetate was made and after standing 2% was added to the resin of Example 1.

Gel time—18¾ min.

(3) A control of 1% methyl ketone peroxide with the resin of Example 1.

Gel time—43 min.
Temperature—23° C.

EXAMPLE 17

The following monomers containing 1% of cobalt napthenate (6%) were treated as follows with 1% methyl ethyl ketone peroxide.

60° C.

| | Gel time, min. |
|---|---|
| Methyl methacrylate | 95 |
| Methyl methacrylate plus 0.5% 2,4-pentanedione | 35 |

Room temperature (0.5% cobalt naphthenate)

| | Gel time, hrs. |
|---|---|
| Methyl methacrylate | >48 |
| Methyl methacrylate plus 0.5% 2,4-pentanedione | 8 |

Heated at 105° C. for 4 hrs. and 20 min. then raised to 145° C.

| | Gel time |
|---|---|
| Vinyltoluene | 5'10" |
| Vinyltoluene plus 0.5% 2,4-pentanedione | 4'50" |
| Styrene | 5'50" |
| Styrene plus 0.5% 2,4-pentanedione | 5'20" |

While particular embodiments of the present invention have been shown and described, it will be obvious to those skilled in the art that changes and modifications may be made without departing from this invention in its broader aspects, and, therefore, the aim of the appended claims is to cover all such changes and modifications that fall within the true spirit and scope of this invention.

I claim:

1. The process of polymerizing "unsaturated polyester resins"; said process comprising incorporating into said resin a minor portion of a soluble cobalt salt, a minor portion of a compound selected from the group consisting of: ethylene diamine tetraacetic acid and diethylene triamine pentaacetic acid, and a minor portion of methyl ethyl ketone peroxide.

2. The process of polymerizing "unsaturated polyester resins"; said process comprising incorporating into said resin, a minor portion of a soluble cobalt salt, a minor portion of ethylene diamine tetraacetic acid, and a minor portion of methyl ethyl ketone peroxide.

3. The process of polymerizing "unsaturated polyester resins"; said process comprising incorporating into said resin, a minor portion of a soluble cobalt salt, a minor portion of diethylene triamine pentaacetic acid and a minor portion of methyl ethyl ketone peroxide.

References Cited

UNITED STATES PATENTS

| 2,921,873 | 1/1960 | Rogers | 260—864 |
| 2,933,475 | 4/1960 | Hoover et al. | 260—63 |
| 3,297,788 | 1/1967 | Dun et al. | 260—863 |

FOREIGN PATENTS

| 801,795 | 9/1958 | Great Britain. |
| 833,764 | 3/1960 | Great Britain. |
| 941,660 | 11/1963 | Great Britain. |
| 1,005,267 | 3/1957 | Germany. |

MURRAY TILLMAN, *Primary Examiner.*

J. T. GOOLKASIAN, *Assistant Examiner.*